United States Patent
Salubro

(10) Patent No.: US 11,374,389 B2
(45) Date of Patent: Jun. 28, 2022

(54) STABILIZING BRACKETS FOR ELECTRICAL BOXES

(71) Applicant: Hubbell Incorporated, Shelton, CT (US)

(72) Inventor: Sigfrido Salubro, West Lebanon, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/997,294

(22) Filed: Aug. 19, 2020

(65) Prior Publication Data

US 2021/0066900 A1  Mar. 4, 2021

Related U.S. Application Data

(60) Provisional application No. 62/892,077, filed on Aug. 27, 2019.

(51) Int. Cl.
*H02G 3/08* (2006.01)
*H02G 3/12* (2006.01)

(52) U.S. Cl.
CPC .............. *H02G 3/126* (2013.01); *H02G 3/081* (2013.01)

(58) Field of Classification Search
CPC .......... H02G 3/08; H02G 3/081; H02G 3/126; H02G 3/086; H02G 3/10; H02G 3/125; H05K 5/00; H05K 5/02; H05K 5/0204; H05K 5/0217
USPC .. 174/50, 480, 481, 53, 57, 58, 535, 63, 61; 220/3.2–3.9, 4.02; 248/906, 343, 27.1
See application file for complete search history.

(56) References Cited

U.S. PATENT DOCUMENTS

| | | | | |
|---|---|---|---|---|
| 4,898,357 A | * | 2/1990 | Jorgensen | H02G 3/126 174/503 |
| 4,978,092 A | * | 12/1990 | Nattel | H02G 3/123 220/3.7 |
| 5,031,789 A | * | 7/1991 | Dauberger | H02G 3/125 220/3.9 |
| 5,452,873 A | * | 9/1995 | Laughlin | H02G 3/126 248/205.1 |
| 5,646,371 A | * | 7/1997 | Fabian | H02G 3/123 174/58 |
| 6,749,162 B2 | | 6/2004 | Nicolides et al. | |
| 6,870,101 B1 | | 3/2005 | Hull et al. | |

(Continued)

OTHER PUBLICATIONS

Hubbell Canada LC, Trade Select, Steel Stud Boxes Brochure, Aug. 2013, www.hubbellonline.com/wiring, 2 pgs.

(Continued)

*Primary Examiner* — Angel R Estrada
(74) *Attorney, Agent, or Firm* — Wissing Miller LLP

(57) ABSTRACT

The present disclosure relates to electrical box assemblies and universal stabilizing brackets that can be used to stabilize electrical boxes attached to different size wall studs. The electrical box assemblies include an electrical box and a stabilizing bracket. Each stabilizing brackets includes a base, a front stop, a rear stop and one or more rear stop segments. The front and rear stops and the rear stop segments include a face member that extends substantially perpendicularly relative to the base. One or more notches are positioned at a junction between each rear stop to facilitate the breaking away of rear stop segments to modify the length of the stabilizing bracket.

38 Claims, 7 Drawing Sheets

(56) References Cited

U.S. PATENT DOCUMENTS

| | | | |
|---|---|---|---|
| 6,940,017 B2 | 9/2005 | Roesch et al. | |
| 7,049,511 B2 * | 5/2006 | Gledhill | H01R 13/73 |
| | | | 174/58 |
| 7,112,743 B2 | 9/2006 | Hull et al. | |
| 7,170,003 B2 * | 1/2007 | Fields | H02G 3/123 |
| | | | 174/481 |
| 7,439,443 B2 | 10/2008 | Dinh | |
| 7,476,807 B1 * | 1/2009 | Gretz | H02G 3/123 |
| | | | 174/58 |
| 7,628,286 B2 * | 12/2009 | Lalancette | H02G 3/126 |
| | | | 220/3.6 |
| 7,659,477 B2 * | 2/2010 | Korcz | H02G 3/126 |
| | | | 174/58 |
| D612,226 S | 3/2010 | Dinh | |
| 7,798,458 B2 | 9/2010 | Borbolla et al. | |
| 8,975,519 B2 | 3/2015 | Lalancette et al. | |
| 9,035,175 B2 * | 5/2015 | Korcz | H02G 3/086 |
| | | | 174/50 |
| 9,397,491 B2 | 7/2016 | Birli et al. | |
| 9,627,868 B2 | 4/2017 | Mominee et al. | |

OTHER PUBLICATIONS

Hubbell Canada LP, Trade Select Catalog, www.HubbellOnline.com, Section A Box Devices, Sep. 2011, 52 pgs.

Eaton Couse-Hinds Series, Commercial Products Catalog, www.crouse-hinds.com, 2015, 70 pgs (pp. 173-179).

Thomas & Betts, Steel City Catalog, www.tnb.com, Section A Metallic Boxes and Covers, 2003, 40 pgs (pp. A7, A11 and A20-A22).

Vista Electrical, Product Catalog, www.vistaelectrical.com, 2012, 18 pgs (pp. 3, 9, 10, 11 and 15).

\* cited by examiner

STABILIZING BRACKETS FOR ELECTRICAL BOXES

CROSS-REFERENCE TO RELATED APPLICATIONS

The present disclosure is based on and claims benefit from U.S. Provisional Patent Application Ser. No. 62/892,077 filed on Aug. 27, 2019 entitled "Stabilizing Brackets for Electrical Boxes" the contents of which are incorporated herein in their entirety by reference.

BACKGROUND

Field

The present disclosure relates generally to stabilizing brackets used to stabilize electrical boxes mounted to studs. More particularly, the present disclosure relates to stabilizing brackets for stabilizing or supporting electrical boxes attached to studs where the electrical box may flex after being attached to the stud.

Description of the Related Art

Electrical boxes are utilized to contain wiring and to mount electrical devices, such as switches, outlets, network ports, etc. Generally, in new construction, the electrical boxes are mounted to the wall studs. When mounted to wood studs, the electrical boxes can be nailed or screwed to the studs providing a secure and firm connection. To lower cost, metallic studs, aka steel studs, may be used in addition to or alternatively to wood studs. Steel studs are generally formed from thin gauge sheet steel. While steel studs provide a strong, light weight and low cost alternative to wood studs, they are not without issues. For example, when an electrical box is mounted to a steel stud, the electrical box tends to have some flex so that when, for example, inserting and/or removing a plug from an electrical receptacle mounted in the electrical box, the electrical box may flex.

SUMMARY

The present disclosure provides exemplary embodiments of variable length stabilizing or support brackets that can be attached to a side of an electrical box that is opposite the side of the electrical box mounted to a stud, and where the length of the stabilizing bracket can be easily modified by an end user to accommodate various wall thicknesses without requiring separate brackets or attaching extension pieces to the stabilizing bracket. The stabilizing bracket according to the present disclosure is provided to limit and possibly prevent the flexing of an electrical box mounted to a stud, e.g., a steel stud.

In one exemplary embodiment, the stabilizing bracket includes a base, a front stop, a rear stop and a plurality of rear stop segments. The base is a substantially flat plate. The front stop extends from a first end portion of the base, and the rear stop extends from a second end portion of the base. The plurality of rear stop segments are arranged in series with a first of the plurality of rear stop segments extending from a second end portion, e.g., from the rear stop, of the base. Each rear stop segment can be individually removed from the stabilizing bracket.

In another exemplary embodiment, the stabilizing bracket includes a base, a front stop, a rear stop, a plurality of rear stop segments and at least one notch. The base is a substantially flat plate. The front stop extends from a first end portion of the base, and the rear stop extends from a second end portion of the base. The plurality of rear stop segments are arranged in series with a first of the plurality of rear stop segments extending from a second end portion, e.g., from the rear stop, of the base. Each rear stop segment can be individually removed from the stabilizing bracket. The at least one notch is formed between each rear stop segment and facilitates the individual removal of the rear stop segments from the stabilizing bracket.

In another exemplary embodiment, the stabilizing bracket includes a base, a plurality of members extending substantially perpendicularly from the elongated base and a plurality of notches formed in the elongated base adjacent the plurality of members allowing at least two of the plurality of members and portions of the elongated base to be removed by an end user.

The present disclosure also provides embodiments of electrical box assemblies that include an electrical box and a stabilizing bracket. In one exemplary embodiment of an electrical box has at least two side walls and can be attached to a stud so that a first of the at least two side walls is adjacent the stud when the electrical box is attached to the stud. The stabilizing bracket is attached to a second of the at least two side walls. The stabilizing bracket includes a base, a front stop, a rear stop and a plurality of rear stop segments. The base is a substantially flat plate. The front stop extends from a first end portion of the base, and the rear stop extends from a second end portion of the base. The plurality of rear stop segments are arranged in series with a first of the plurality of rear stop segments extending from a second end portion, e.g., the rear stop, of the base. Each rear stop segment can be individually removed from the stabilizing bracket.

In another exemplary embodiment, the electrical box assembly includes an electrical box and a stabilizing bracket. The electrical box includes a mounting bracket used to attach the electrical box to a wall stud. The stabilizing bracket is attached to the electrical box and includes an elongated base, a plurality of members extending substantially perpendicularly from the elongated base, and a plurality of notches formed in the elongated base adjacent the plurality of members allowing at least two of the plurality of members and portions of the elongated base to be removed by an end user.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
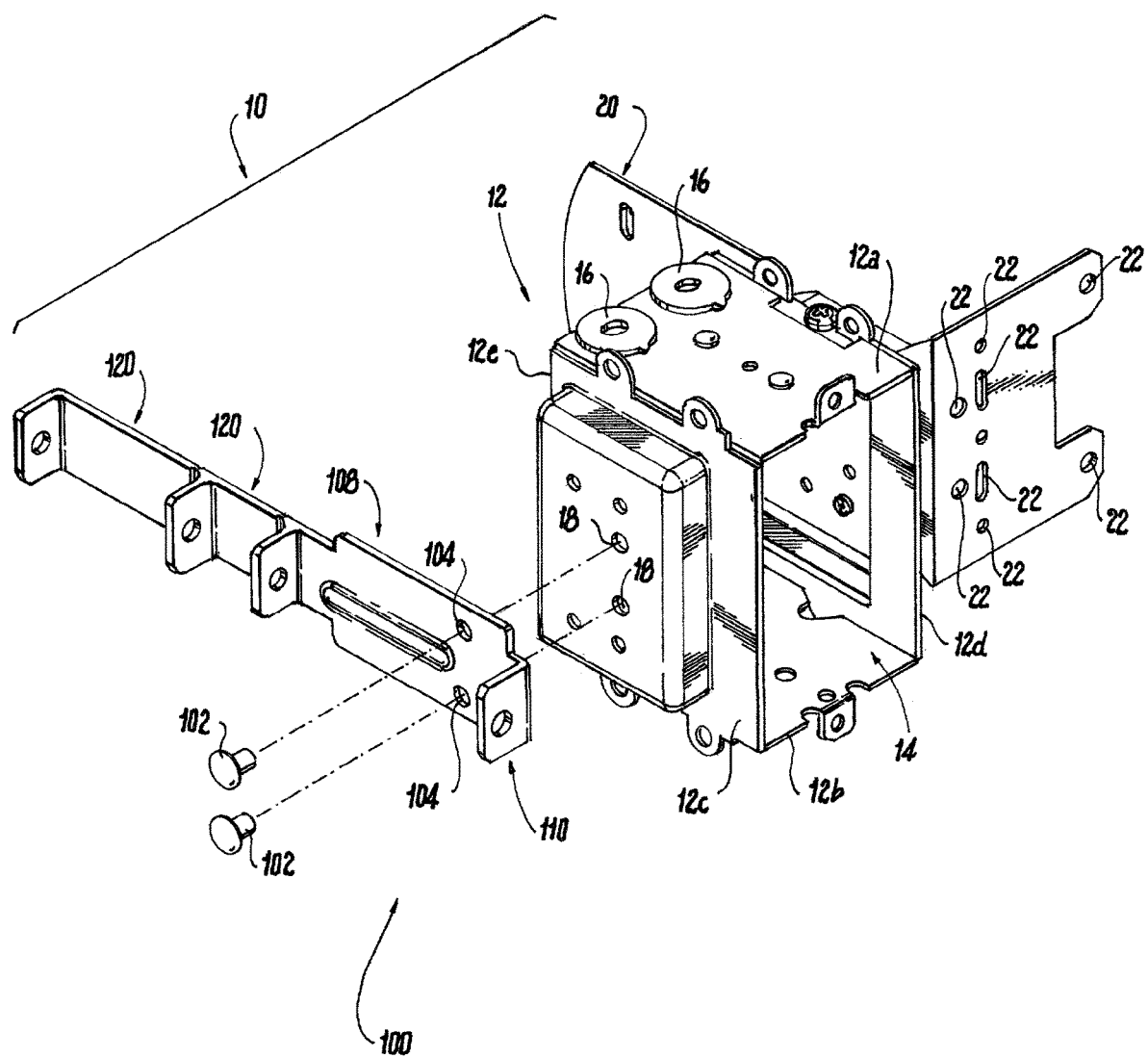
FIG. 1 is a perspective view with parts separated of an exemplary embodiment of an electrical box assembly according to the present disclosure, illustrating an electrical box and a stabilizing bracket.

The following exemplary embodiments are set forth to aid in an understanding of the subject matter of this disclosure but are not intended and may not be construed to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner. For ease of description, the stabilizing brackets according to the present disclosure may also be referred to herein as the "brackets" in the plural and the "bracket" in the singular. The electrical boxes according to the present disclosure may also be referred to herein as the "boxes" in the plural and the "box" in the singular.

Exemplary embodiments of stabilizing brackets according to the present disclosure are shown and described. The stabilizing brackets according to the present disclosure are configured and dimensioned to be attached to an electrical box and to be modifiable in the field to allow an installer to modify the length of the stabilizing bracket depending upon the dimensions of the studs to which the electrical box is attached. According to the exemplary embodiments of the present disclosure, the electrical box can be secured to a stud, e.g. a wall stud, and the stabilizing bracket limits and possibly prevents the electrical box from flexing or partially rotating when an orthogonal force is applied to the electrical box relative to the side walls of the electrical box. The types of studs the electrical boxes can be secured to include but are not limited to steel studs and wood studs.

The stabilizing brackets according to the present disclosure are preferably unitary or monolithic structures that may be sized by the installer in the field and utilized to stabilize electrical boxes in various wall thicknesses. According to the exemplary embodiments of the present disclosure, the stabilizing brackets have a front stop and a plurality of rear stop segments. The front and rear stops are preferably configured to contact or engage inside surfaces of wall panels attached to studs to limit and possibly prevent the electrical box from flexing or partially rotating when an orthogonal force is applied to the electrical box relative to the side walls of the electrical box. The rear stop segments are in the form of breakaway sections that permit an installer to modify the length of the stabilizing bracket in the field, i.e., on site, for differently configured wall thicknesses.

According to exemplary embodiments of the present disclosure, the bracket may be attached to or monolithically formed into the electrical box and delivered to or purchased by the installer as a single unit. According to other exemplary embodiments, the electrical box and bracket may be delivered to or purchased by the installer as separate components and then assembled, e.g., attached together, in the field.

Figure 2:
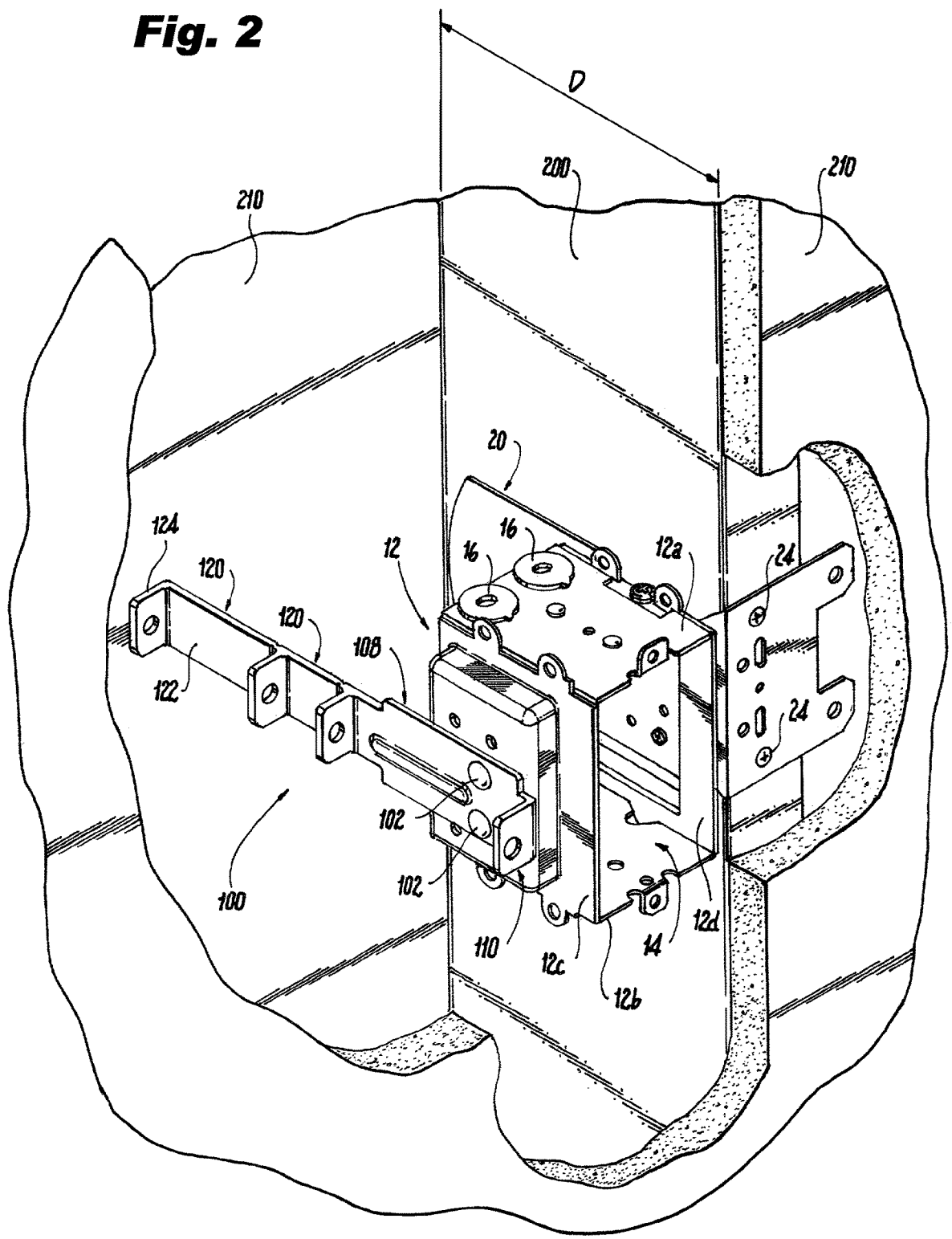
FIG. 2 is a partial cutaway perspective view of a wall revealing the electrical box assembly of FIG. 1 attached to a stud, and illustrating the stabilizing bracket attached to the electrical box and positioned between wall panels to stabilize the electrical box within the wall to limit flexing of the electrical box.

Referring now to FIGS. 1 and 2, an exemplary embodiment of an electrical box assembly according to the present disclosure is shown. The electrical box assembly 10 includes an electrical box 12 and a bracket 100. The box 12 may be any type of electrical box that may be secured to a stud, e.g., a metal stud. The box 12 may be, for example, a metallic box or a plastic box. Although shown for illustrative purposes as a single gang switch/outlet box, the box 12 may be any style/size of electrical box that may be secured to a stud, including but not limited to, multi-gang switch/outlet boxes, round boxes and square boxes. A typical box 12 includes a top wall 12a, a bottom wall 12b, two side walls 12c and 12d and a rear wall 12e that form an opening 14 capable of receiving one or more electrical wires (not shown) and one or more electrical devices (not shown), such as switches and outlets. The walls of the box 12 may include one or more pry-outs or knockouts 16, seen in FIG. 1, that permit electrical cabling to be inserted into the opening 14 in the box 12 so that electrical wires within the cabling are accessible through the opening 14.

Continuing to refer to FIGS. 1 and 2, to facilitate securing the box 12 to a stud, the electrical box may include a mounting bracket 20. The mounting bracket 20 may be secured to one side, e.g., side 12c or 12d, of the box 12, as shown. In the exemplary embodiment shown, the mounting bracket 20 is an L-shaped bracket secured to, or integrally or monolithically formed into the side wall 12d of the box 12. The mounting bracket 20 may include one or more orifices 22 that may be utilized to attach the box 12 to the stud 200 and, in particular, to a steel stud, using for example, fasteners 24, seen in FIG. 2, or clips.

Referring to FIGS. 1-4, the bracket 100 according to the present disclosure is preferably secured to, or integrally or monolithically formed into a side wall of the box 12 that is opposite the side wall to which the mounting bracket 20 is attached. In this exemplary embodiment, the mounting bracket 20 is attached to the side wall 12d such that the bracket 100 is attached to the side wall 12c, as shown in FIG. 2. The bracket 100 may be attached to, e.g., secured to, or integrally or monolithically formed into the side wall of the box 12, in any suitable manner. For example, the bracket 100 may be secured to the box 12 utilizing one or more fasteners 102. The fasteners 102 may be rivets or screws that pass through one or more mounting holes 104 in bracket 100 and are riveted or screwed into holes 18 provided in the side wall 12c of the box 12. As a non-limiting example, the fasteners 102 may be self-tapping screws that pass through the mounting holes 104 in the bracket 100 and when screwed into the holes 18 in the side wall 12c of the box 12 create threads therein. As another non-limiting example, the fasteners 102 may be set screws and the holes 18 may be threaded holes. As another non-limiting example, the fasteners 102 may be rivets including but not limited to plastic or metal pop rivets, push-type rivets, screw-type rivets, etc. As another non-limiting example, the bracket 100 may be attached to the box 12 using adhesives or welds.

Figure 3:
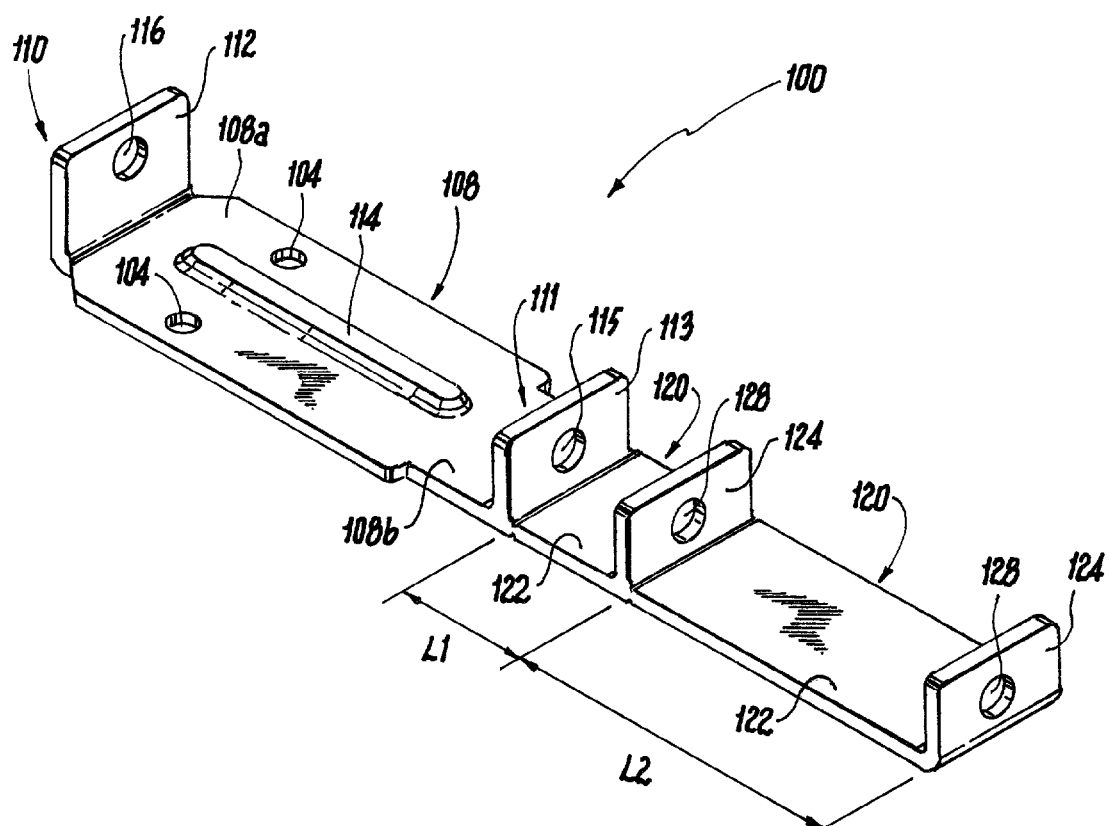
FIG. 3 is a perspective view of the stabilizing bracket of FIG. 1, illustrating a front stop and a rear stop attached to a base, and multiple rear stop segments attached to the base in series with the rear stop segments being individually removable from the base.
Figure 4:
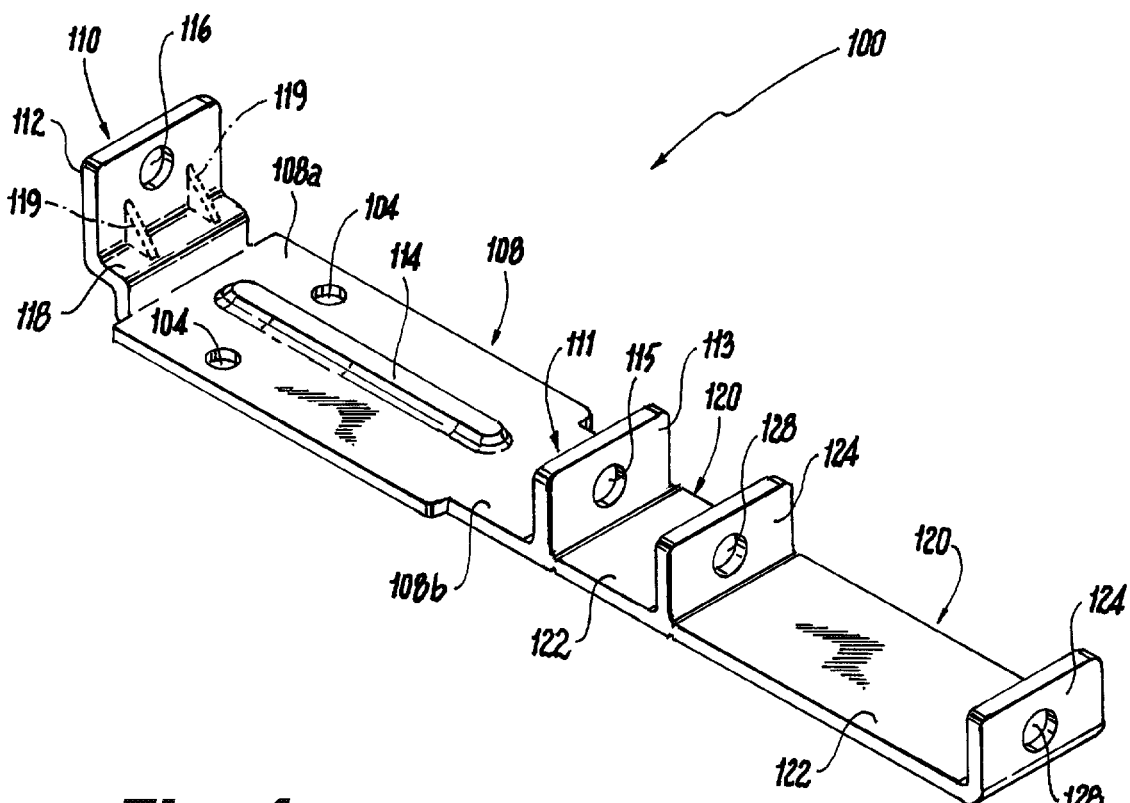
FIG. 4 is a perspective view of another exemplary embodiment of a stabilizing bracket according to the present disclosure, illustrating a front stop and a rear stop extending from a base, and multiple rear stop segments of different sizes attached to the base in series with the rear stop segments being individually removable from the base.

The bracket 100 includes a base 108, a front stop 110, a rear stop 111 and one or more rear stop segments 120 as seen in FIG. 3. In this exemplary embodiment the base 108 is a substantially flat and elongated plate with one or more raised ribs 114 that provide structural rigidity and lateral support to the base 108. The base 108 may also include the one or more mounting holes 104, described above, used when attaching the bracket 100 to the box 12. The front stop 110 extends from a first end portion 108a of the base 108 as shown in FIG. 3. More specifically, the front stop 110 is attached to, e.g., secured to, or integrally or monolithically formed into, the first end portion 108a of the base 108 and includes a face member 112 that extends substantially perpendicularly from the base 108. The front stop 110 is oriented relative to the base 108 so that the face member 112 can engage or abut against an inside surface of a wall panel 210 (e.g., drywall, paneling, cement board, etc.) when the bracket 100 is attached to the box 12, when the box 12 is attached to a stud 200 and when the wall panel 210 is secured to the stud 200, as shown in FIG. 2. In the exemplary embodiment shown, the face member 112 may be a substantially flat structure with a surface area sufficient to contact inside surface of a wall panel 210 without negatively impacting the integrity of the wall panel 210. In another exemplary embodiment, the face member 112 may also include one or more raised surfaces or dimples (not shown) that may further improve engagement of the face member 112 with the wall panel 210 without negatively impacting the integrity of the wall panel 210. The face member 112 may include an aperture 116 that reduces the weight of the bracket 100 and reduces the amount of material used to fabricate the bracket 100. In another exemplary embodiment shown in FIGS. 4 and 5, the front stop 110 may also include an attachment arm 118 that extends from the front end portion 108a of the base 108. In instances where an attachment arm 118 is included in the front stop 110, the face member 112 is preferably attached to, e.g., secured to or integrally or monolithically formed into the attachment arm 118 so that the attachment arm provides an offset between the face member 112 and the base 108 to help ensure that the face member 112 contacts the wall panel 210. To provide additional support between the attachment arm 118 and the face member 112, one or more gussets 119 can be molded into or secured between the attachment arm 118 and the face member 112 as seen in FIG. 4. The rear stop 111 extends from a second end portion 108b of the base 108 as shown in FIG. 3. More specifically, the rear stop 111 is attached to, e.g., secured to, or integrally or monolithically formed into, the second end portion 108b of the base 108 and includes a face member 113 that extends substantially perpendicularly from the base 108. The rear stop 111 is oriented relative to the base 108 so that the face member 113 can engage or abut against an inside surface of a wall panel 210 (e.g., drywall, paneling, cement board, etc.) when the bracket 100 is attached to the box 12, when the box 12 is attached to a stud 200 and when the wall panel 210 is secured to the stud 200, as shown in FIG. 2. In the exemplary embodiment shown, the face member 113 may be a substantially flat structure with a surface area sufficient to contact inside surface of a wall panel 210 without negatively impacting the integrity of the wall panel. In another exemplary embodiment, the face member 113 may also include one or more raised surfaces or dimples (not shown) that may further improve engagement of the face member 113 with the wall panel 210 without negatively impacting the integrity of the wall panel. The face member 113 may include an aperture 115 that reduces the weight of the bracket 100 and reduces the amount of material used to fabricate the bracket.

Figure 5:
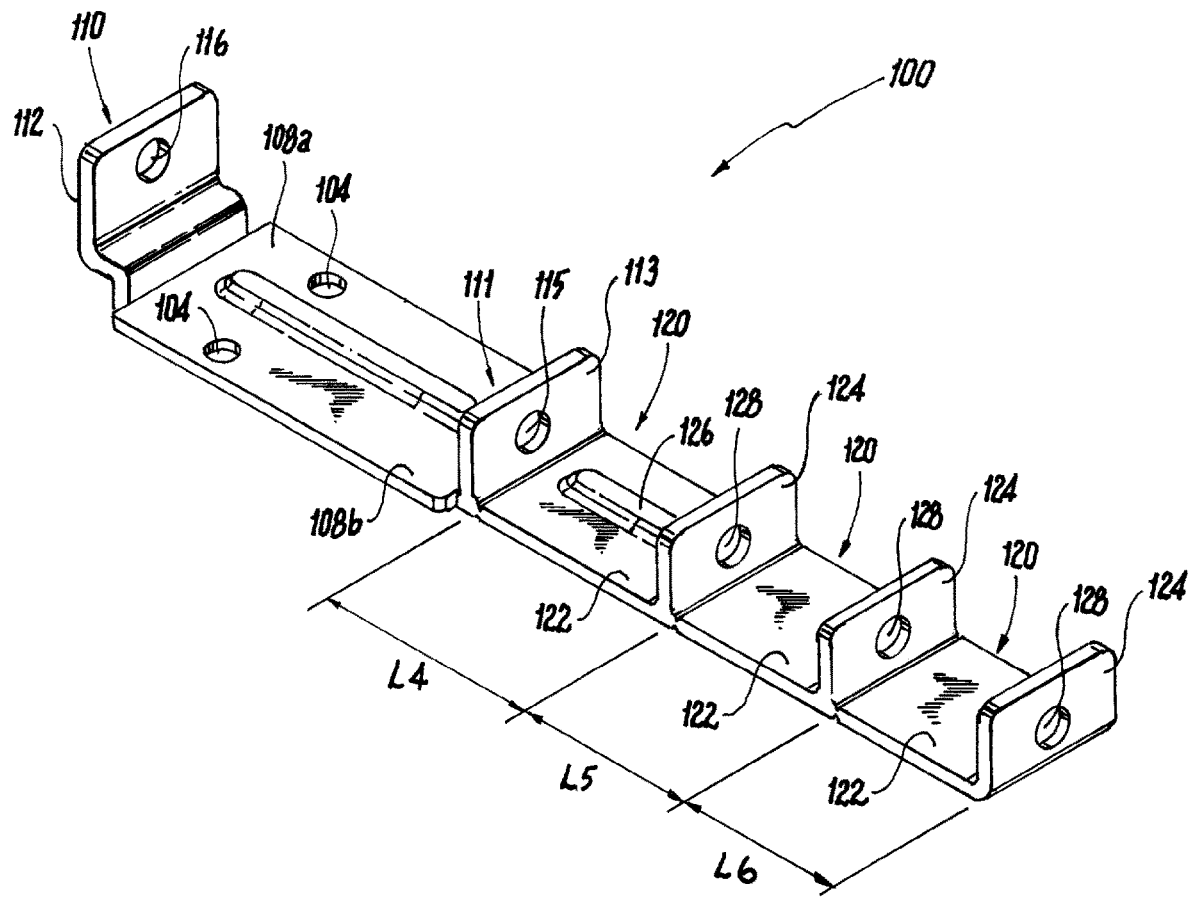
FIG. 5 is a perspective view of another exemplary embodiment of a stabilizing bracket according to the present disclosure, illustrating a front stop and a rear stop attached to a base, and multiple rear stop segments of the same size attached to the base in series with the rear stop segments being individually removable from the base.

The one or more rear stop segments 120 extend from a second end portion 108b of the base 108, e.g., the rear stop 111, in series as shown in FIGS. 3-5. The one or more rear stop segments 120 are breakaway segments that permit an installer to break one or more rear stop segments 120 away from the base 108 of the bracket 100 to modify the length of the bracket 100 to accommodate the depth "D" (seen in FIG. 2) between the wall panels 210. Each rear stop segment 120 includes a main body 122 and a face member 124. To provide additional support between the main body 122 and the face member 124 of each rear stop 120, one or more gussets, similar to the gussets 119 described above, may be molded into or secured between the main body 122 and the face member 124.

Continuing to refer to FIGS. 3-5, the main body 122 of each rear stop segment 120 may be a flat elongated plate with one or more raised ribs 126, seen in FIG. 5, that provide structural rigidity and lateral support to the main body 122. The main body 122 of each rear stop segment 120 has a predefined length that forms the desired length of the bracket 100. The length of the main body 122 of each rear stop segment 120 may be the same or they may differ. For example, in the exemplary embodiment of FIGS. 3 and 4, the first in line rear stop segment 120, which is adjacent the base 108, has a length "L1" and the next in line rear stop segment 120 has a length "L2." Length "L1" is different than length "L2." As a non-limiting example, the length "L1" of the main body 122 of the first in line rear stop segment 120 may be about 1.125 inches, the length "L2" of the main body 122 of the next (second) in line rear stop segment 120 may be about 2.361 inches. As another example, in the exemplary embodiment of FIG. 5, the first in line rear stop segment 120, which is adjacent the base 108, has a length "L4," the next in line rear stop segment 120 has a length "L5" and the next in line rear stop segment 120 has a length "L6." In this exemplary embodiment, the lengths "L4," "L5" and "L6" are the same. As a non-limiting example, the lengths "L4," "L5" and "L6" may be about 1.0 inch. However, as noted above, the lengths "L4," "L5" and "L6" may differ. As a non-limiting example, the length "L4" of the main body 122 of the first in line rear stop segment 120 may be about 1.125 inches, the length "L5" of the main body 122 of the next (second) in line rear stop segment 120 may be about 2.361 inches, and the length "L6" of the main body 122 of the next (third) in line rear stop segment 120 may be about 1.839 inches for a 2"×8" steel stud.

Referring again to FIGS. 1-4, the rear stop segments 120 are oriented relative to the base 108 so that the face members 124 of each rear stop segment can engage or abut against an inside surface of a wall panel 210 (e.g., drywall, paneling, cement board, etc.) when the bracket 100 is attached to the box 12, when the box 12 is attached to a stud 200 and when the wall panel 210 is secured to the stud 200. In the exemplary embodiments shown in FIGS. 3-5, the face members 124 may be a substantially flat structures with a surface area sufficient to contact inside surface of a wall panel 210 without negatively impacting the integrity of the wall panel. In another exemplary embodiment, the face members 124 may also include one or more raised surfaces or dimples (not shown) that may facilitate engagement of the face members 124 with the wall panel 210 without negatively impacting the integrity of the wall panel. Each face member 124 may include an aperture 128 that reduces the weight of the bracket 100 and reduces the amount of material used to fabricate the bracket.

Although depicted as generally rectangular in shape, the base 108, the face member 112 of the front stop 110 and the face 113 of the rear stop 111 may be provided in any suitable shape including but not limited to square, triangular, round, oblong, etc. Similarly, the main body 122 and the face member 124 of each rear stop segment 120 may be provided in any suitable shape including but not limited to square, triangular, round, oblong, etc.

Referring again to FIGS. 1-4, as noted above, the length of the bracket 100 is adjustable by an installer so that the bracket 100 can be used to stabilize electrical boxes mounted to various size studs 200 forming various wall thicknesses. For example, wall studs 200 generally have nominal sizes, such as 2"×3", 2"×4", 2"×6", 2"×8", etc. Using the bracket 100 according to the present disclosure, one or more of the rear stop segments 120 of the bracket 100 can be removed so that the bracket can be used with the various size studs, e.g., various size wall thicknesses. However, the actual size of each such studs is typically smaller than the nominal size. As examples, the actual size of a 2"×3" stud is about 1½"×2½", the actual size of a 2"×4" stud is about 1½"×3½", and the actual size of a 2"×6" steel stud is about 1½"×6." It is noted that the nominal size and actual size of a steel 2"×6" stud is about the same. However, the actual size of a wood 2"×6" stud is about 1½"×5½." To ensure the bracket 100 provides a tight fit between the wall panels 210, the length of the base 108 from the front stop 110 to the rear stop 111 or the different rear stop segments 120 of the bracket 100 may be slightly larger than the actual width of the studs 200. For example and referring to FIG. 6, for a 2"×6" stud, a length "A" from the front stop 110 to the rear stop 111 of the base 108 plus the length of the two rear stop segments 120 may be about 6.036 inches, which is slightly larger than the 6" width of a 2"×6" steel stud. In this example, no rear stop segments were removed. As another example, for a 2"×4" stud, a length "B" from the front stop 110 to the rear stop 111 of the base 108 plus the length of the first in line rear stop segment 120 may be about 3.675 inches, which is slightly larger than the 3½" width of the 2"×4" stud. In this example, one rear stop segment 120 was removed. As another example, for a 2"×3" stud, a length "C" from the front stop 110 to the rear stop 111 of the base 108 may be about 2.550 inches, which is slightly larger than the 2½" width of the 2"×3" stud. In this example, the two rear stop segments 120 were removed.

Figure 6:
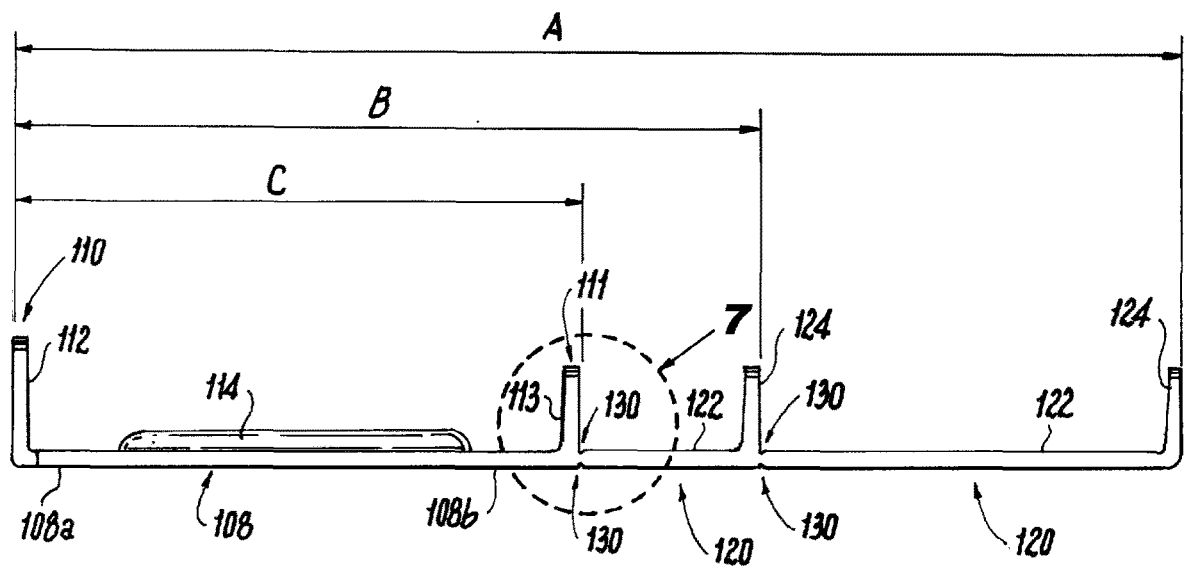
FIG. 6 is a side elevation view of the stabilizing bracket of FIG. 3, illustrating one or more breakaway notches between the base and the first in line rear stop segment, and one or more breakaway notches between the first in line stop segment and the second in line stop segment.
Figure 7:
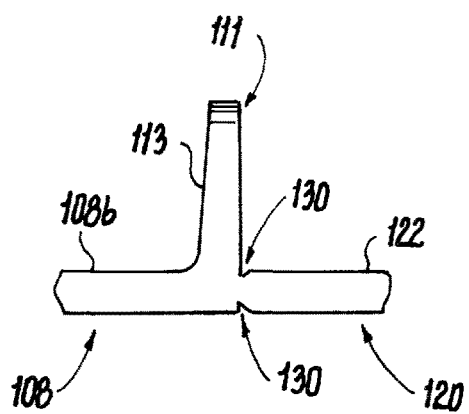
FIG. 7 is an enlarged side elevation view of a portion of the stabilizing bracket of FIG. 6 taken from detail 7 and illustrating the one or more breakaway notches between the base and the first in line rear stop segment.
Figure 8:
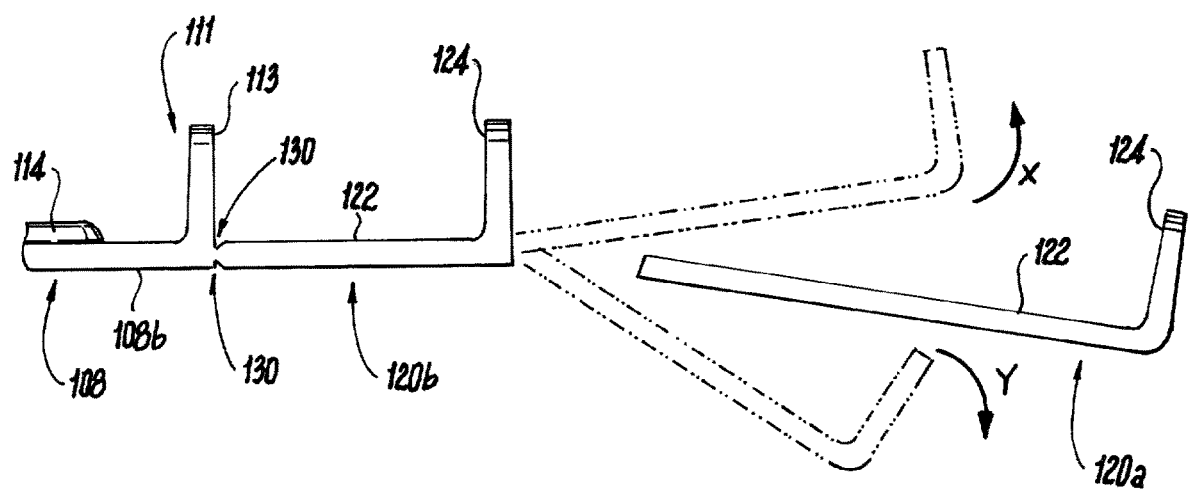
FIG. 8 is a side elevation view of a portion of the stabilizing bracket of FIG. 6, illustrating the last in line rear stop segment being broken away from the preceding rear stop segment at the one or more notches.

To facilitate separating or breaking away the first in line rear stop segment 120 from the base 108, one or more notches 130, seen in FIG. 7, may be provided adjacent the rear stop 111 at the second end portion 108b of the base 108. To facilitate separating or breaking away the subsequent rear stop segment or segments 120 from each other, one or more notches 130 may be provided at the end of each rear stop 120 adjacent the face member 124, as shown in FIG. 6. As noted above with respect to the exemplary embodiment of FIG. 6, the overall length "A" of the bracket 100 may be about 6.036 inches which is suitable for use with boxes 12 mounted to 2"×6" studs. If an installer has 2"×4" studs, the installer can articulate or bend the last in line rear stop 120a, seen in FIG. 8, back and forth in the directions of arrows "X" and "Y" so that the junction between the notches 130 positioned between the last in line rear stop segment 120a and the preceding rear stop segment 120b breaks. With the junction between the notches 130 broken, the last in line rear stop segment 120a is separated from the bracket 100 and can be removed from the bracket 100, as seen in FIG. 8, and discarded. This would provide a bracket 100 of suitable length, e.g., about 3.675 inches, for use with electrical boxes mounted to 2"×4" studs. Similarly, if an installer has 2"×3" studs, the installer can articulate or bend the rear stop segment 120b, seen in FIG. 8, back and forth in the directions of arrows "X" and "Y" so that the junction between the notches 130 positioned between the rear stop segment 120b and the base 108 breaks. With the junction between the notches 130 broken, the rear stop segments 120a and 120b are separated from the bracket 100 and can be removed and discarded. This would provide a bracket 100 of suitable length, e.g., about 2.550 inches, for use with electrical boxes mounted to 2"×3" studs.

The above described exemplary embodiments provide an installer customizable bracket to be utilized to stabilize electrical boxes in various thickness walls without the need of purchasing different size stabilizing brackets.

The stabilizing brackets according to the present disclosure can be formed of any material having sufficient rigidity and strength to stabilize an electrical box attached to studs that may flex or rotate when, for example, inserting or removing a plug from an electrical receptacle. The brackets 100 can be formed of a sufficiently rigid material that performs the stabilizing operation described herein. Non-limiting examples of suitable materials include metal, plastic and/or polymer materials. A specific example of a suitable material is NORYL™ SE100X resin or equivalent flame retardant material. The brackets 100 may be manufactured using any suitable types of processes. For example, the brackets 100 can be molded with all holes, notches, etc. formed in situ. Alternatively, brackets 100 can be extruded with all holes, notches, etc. then machined or drilled. The brackets 100 may also be formed utilizing additive and/or subtractive manufacturing processes.

The face members 112, 113 and 124 are described herein as extending "substantially perpendicularly" to the base 108 and/or the main body 122. It will be appreciated that the term "substantially perpendicularly" embraces angles other than 90 degrees. That is, face members 112, 113 and 124 may extend at any angle relative to the base 108 and/or the main body 122 that may be deemed suitable for performing the stabilizing operation described herein.

While the exemplary embodiments of the present disclosure have been described utilizing U.S. standard units of measure, it will be appreciated that other units of measure, including metric, may be readily substituted therefor.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. An electrical box stabilizing bracket comprising:
   a base having a front stop extending from a first end portion of the base and a rear stop extending from a second end portion of the base; and
   a plurality of rear stop segments arranged in series with a first of the plurality of rear stop segments extending from the rear stop of the base, wherein each rear stop segment can be individually removed from the stabilizing bracket.

2. The stabilizing bracket according to claim 1, wherein the front stop includes a face member that is substantially perpendicular to the base, and the rear stop includes a face member that is substantially perpendicular to the base.

3. The stabilizing bracket according to claim 1, wherein each rear stop segment includes a face member that is substantially perpendicular to the base.

4. The stabilizing bracket according to claim 1, further comprising at least one notch formed between each rear stop segment that facilitates individual removal of the rear stop segments from the stabilizing bracket.

5. The stabilizing bracket according to claim 1, wherein each rear stop segment has a predefined length.

6. The stabilizing bracket according to claim 1, wherein each rear stop segment comprises a main body and a face member.

7. The stabilizing bracket according to claim 6, wherein the face member of each rear stop segment is substantially perpendicular to the main body.

8. The stabilizing bracket according to claim 1, wherein a length from the front stop to the rear stop of the base and at least one of the plurality of rear stop segments is sufficient to fit between a 2"×6" stud.

9. The stabilizing bracket according to claim 1, wherein a length from the front stop to the rear stop of the base and at least one of the plurality of rear stop segments is sufficient to fit between a 2"×4" stud.

10. The stabilizing bracket according to claim 1, wherein a length from the front stop to the rear stop of the base is sufficient to fit between a 2"×3" stud.

11. An electrical box assembly comprising:
an electrical box having at least two side walls, the electrical box being attachable to a stud such that a first of the at least two side walls is adjacent the stud when the electrical box is attached to the stud; and
a stabilizing bracket attached to a second of the at least two side walls, the stabilizing bracket comprising,
a base having a front stop extending from a first end portion of the base and a rear stop extending from a second end portion of the base; and
a plurality of rear stop segments arranged in series with a first of the plurality of rear stop segments extending from the rear stop of the base, wherein each rear stop segment can be individually removed from the stabilizing bracket.

12. The electrical box assembly according to claim 11, wherein the front stop includes a face member that is substantially perpendicular to the base, and the rear stop includes a face member that is substantially perpendicular to the base.

13. The electrical box assembly according to claim 11, wherein each rear stop segment includes a face member that is substantially perpendicular to the base.

14. The electrical box assembly according to claim 11, further comprising at least one notch formed between each rear stop segment that facilitates individual removal of the rear stop segments from the stabilizing bracket.

15. The electrical box assembly according to claim 11, wherein each rear stop segment has a predefined length.

16. The electrical box assembly according to claim 11, wherein each rear stop segment comprises a main body and a face member.

17. The electrical box assembly according to claim 16, wherein the face member of each rear stop segment is substantially perpendicular to the main body.

18. The electrical box assembly according to claim 11, wherein a length from the front stop to the rear stop of the base and at least one of the plurality of rear stop segments is sufficient to fit between a 2"×6" stud.

19. The electrical box assembly according to claim 11, wherein a length from the front stop to the rear stop of the base and at least one of the plurality of rear stop segments is sufficient to fit between a 2"×4" stud.

20. The electrical box assembly according to claim 11, wherein a length from the front stop to the rear stop of the base is sufficient to fit between a 2"×3" stud.

21. An electrical box stabilizing bracket comprising:
a base having a front stop extending from a first end portion of the base and a rear stop extending from a second end portion of the base;
a plurality of rear stop segments arranged in series with a first of the plurality of rear stop segments extending from the rear stop of the base, wherein each rear stop segment can be individually removed from the stabilizing bracket; and
at least one notch formed between each rear stop segment that facilitates individual removal of the rear stop segments from the stabilizing bracket.

22. The stabilizing bracket according to claim 21, wherein the front stop includes a face member that is substantially perpendicular to the base, and the rear stop includes a face member that is substantially perpendicular to the base.

23. The stabilizing bracket according to claim 21, wherein each rear stop segment includes a face member that is substantially perpendicular to the base.

24. The stabilizing bracket according to claim 21, wherein each rear stop segment has a predefined length.

25. The stabilizing bracket according to claim 21, wherein each rear stop segment comprises a main body and a face member.

26. The stabilizing bracket according to claim 25, wherein the face member of each rear stop segment is substantially perpendicular to the main body.

27. The stabilizing bracket according to claim 21, wherein a length from the front stop to the rear stop of the base and at least one of the plurality of rear stop segments is sufficient to fit between a 2"×6" stud.

28. The stabilizing bracket according to claim 21, wherein a length from the front stop to the rear stop of the base and at least one of the plurality of rear stop segments is sufficient to fit between a 2"×4" stud.

29. The stabilizing bracket according to claim 21, wherein a length from the front stop to the rear stop of the base is sufficient to fit between a 2"×3" stud.

30. An electrical box assembly comprising:
an electrical box having at least two side walls, the electrical box being attachable to a stud such that a first of the at least two side walls is adjacent the stud when the electrical box is attached to the stud; and
a stabilizing bracket attached to a second of the at least two side walls, the stabilizing bracket comprising,
a base having a front stop extending from a first end portion of the base and a rear stop extending from a second end portion of the base;
a plurality of rear stop segments arranged in series with a first of the plurality of rear stop segments extending from the rear stop of the base, wherein each rear stop segment can be individually removed from the stabilizing bracket; and
at least one notch formed between each rear stop segment that facilitates individual removal of the rear stop segments from the stabilizing bracket.

31. The electrical box assembly according to claim 30, wherein the front stop includes a face member that is substantially perpendicular to the base, and the rear stop includes a face member that is substantially perpendicular to the base.

32. The electrical box assembly according to claim 30, wherein each rear stop segment includes a face member that is substantially perpendicular to the base.

33. The electrical box assembly according to claim 30, wherein each rear stop segment has a predefined length.

34. The electrical box assembly according to claim 30, wherein each rear stop segment comprises a main body and a face member.

35. The electrical box assembly according to claim 34, wherein the face member of each rear stop segment is substantially perpendicular to the main body.

36. The electrical box assembly according to claim 30, wherein a length from the front stop to the rear stop of the base and at least one of the plurality of rear stop segments is sufficient to fit between a 2"×6" stud.

37. The electrical box assembly according to claim 30, wherein a length from the front stop to the rear stop of the base and at least one of the plurality of rear stop segments is sufficient to fit between a 2"×4" stud.

38. The electrical box assembly according to claim 30, wherein a length from the front stop to the rear stop of the base is sufficient to fit between a 2"×3" stud.

\* \* \* \* \*